Aug. 6, 1940.                D. F. COOK                 2,210,281
                    METHOD OF MAKING TOMBSTONES
                       Filed Sept. 13, 1937
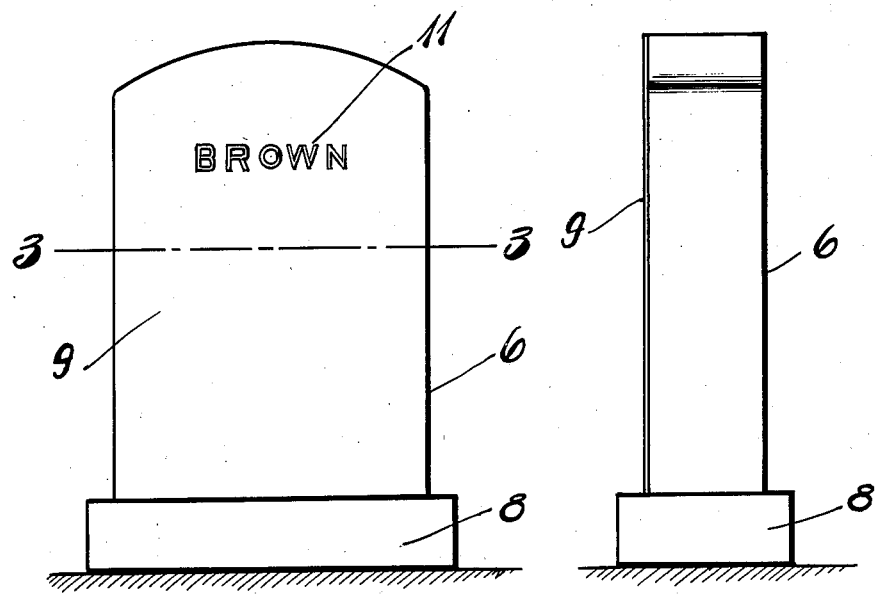
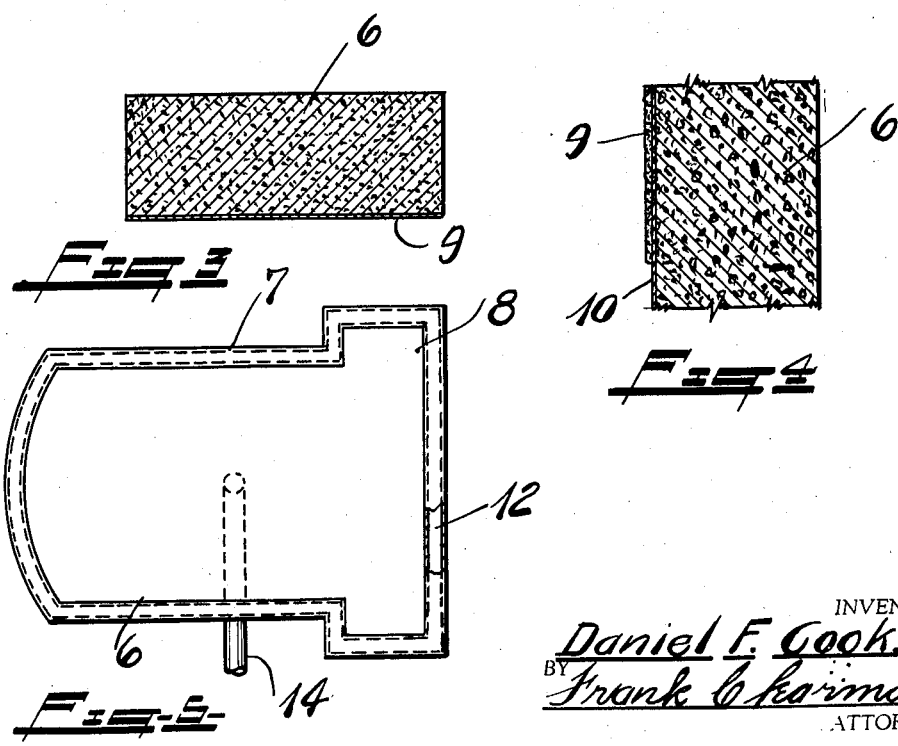
INVENTOR.
Daniel F. Cook.
BY Frank C. Korman.
ATTORNEY.

Patented Aug. 6, 1940

2,210,281

UNITED STATES PATENT OFFICE 2,210,281

METHOD OF MAKING TOMBSTONES

Daniel F. Cook, Pinconning, Mich., assignor of one-half to John R. Fotheringham, Pinconning, Mich.

Application September 13, 1937, Serial No. 163,593

3 Claims. (Cl. 18—60)

This invention relates to tombstones and more particularly to a built-up tombstone to which a granite, marble, or other facing is applied and bonded, thus providing a monument that is practically indestructable, and which can be easily made at a comparatively small cost.

A further object is to provide a tombstone which is economical to construct, which is capable of exposure to the elements without noticeable deterioration.

Another object of the invention is to provide means for applying any desired finish or facing to a tombstone monument or grave marker, and on which any desired inscription or design can be produced without affecting the remainder of the facing.

With the foregoing and other objects in view, my invention consists in the novel features of construction, combination of materials and parts as will be hereinafter more fully described, illustrated in the accompanying drawing and more clearly defined in the appended claims.

In the drawing wherein like characters of reference denote corresponding parts in the different views:

Fig. 1 is a front elevational view of a tombstone constructed in accordance with my invention.

Fig. 2 is an edge view thereof.

Fig. 3 is a transverse sectional plan view taken on the line 3—3 of Fig. 1.

Fig. 4 is a fragmentary sectional edge view showing the sheet of latex and the granular facing.

Fig. 5 is a plan view of a mould showing a connection for steam or other heating medium.

Referring now to the drawing in which I have shown the preferred embodiment of my invention, the numeral 6 indicates a tombstone of conventional shape and design, such as used on graves in cemeteries, the body of the tombstone being made up of a cementitious or other suitable material, placed in a suitable mould 7, in a plastic condition, where it is allowed to cure to form a solid structure, a base 8 can be cast separate or integral with the body 6, and this may be produced in any desired shape, but I prefer to produce it with the lower pedestal shape as shown.

After the cement has been mixed and placed in the mould 7 to set and cure, the desired facing 9 is applied, and this is done while the mixture is still in a plastic condition, a sheet of latex 10 being cut to conform to the shape of the face of the tombstone and is laid thereon, this sheet being very thin and is stretched taut to eliminate any wrinkles or creases in the sheet.

The next step is the application of the granite, marble, or other material 9 selected for the facing, this material is, of course, crushed into small granular particles, and is then applied, by pressure, by means of a spray gun, (not shown) which shoots the particles onto the latex sheet 10, piercing the sheet and embedding the particles in the cement which is still in its plastic state, the latex sheet serving to prevent displacement of the fresh green cement, and further serving to secure the facing particles in position. After the face has been evenly covered, the structure is left to set and cure, thus providing a tombstone which has the same general appearance as one cut from solid granite, marble, or other material.

The inscription 11 is very easily and economically produced, it is merely necessary to provide metal letters or a design (not shown) which are placed in position on the plastic mass in the proper location prior to the application of the facing, then when the facing has been applied these letters or designs are removed, and the desired inscription will appear on the face of the tombstone, no cutting is necessary, and the inscription or design will be true and uniform.

If desired, and more particularly in cold weather, the mass can (after it is placed in the form) be slightly heated to warm the latex and cement prior to the application of the facing, and for this purpose the mould is formed with a double wall forming a chamber 12 which surrounds the face and edges of the structure, a pipe 14 leading to a suitable source of heat supply. However, it is not essential to the successful application of the facing.

If desired the facing can, of course, be eliminated and the structure can be finished with white cement and lime, and polished with the conventional hand emery or other tool, and various mixtures may be used to produce certain results and appearance. Furthermore, it will also be understood that the structure may be reinforced with metal, depending on size, etc.

Tombstones produced as above described can be very economically and easily manufactured, they can be hollow or solid, any desired facing can be accurately and economically applied which also holds true for the inscription or design. The latex and plastic cement firmly bond and hold the granite or other granular particles in position, the facing will wear for an indefinite period of time, it is of neat and pleasing appearance, and the production cost is extremely low.

From the foregoing description it will be obvious that I have perfected a very simple, practical, and inexpensive tombstone and/or marker.

What I claim is:

1. The method of forming a tombstone which consists in providing a mould, filling the mould with a cementitious mixture, placing a sheet of latex over the exposed face of the mixture while it is still in a plastic state, and then shooting the facing particles against the latex embedding them in the latex and plastic mass to form a facing of the material desired.

2. The method of forming a grave marker which consists in providing a mould, filling the mould with a cementitious mixture, and stretching a sheet of latex over the exposed face of the mixture while the mixture is still in a plastic condition, heating the mould, and then shooting facing particles against said latex to pierce the sheet and embed them in the latex and cementitious material prior to the setting of said material.

3. The method of forming a monument which consists in providing a mould of predetermined shape, filling said mould with a cementitious mixture, placing a layer of latex over the exposed face of the mixture while the mixture is still in a plastic state, and then applying a granular facing over said latex, under pressure, so that the particles pierce the latex and become embodied in the mixture prior to the setting of the mass.

DANIEL F. COOK.